US006556707B1

United States Patent
Yagishita et al.

(10) Patent No.: US 6,556,707 B1
(45) Date of Patent: Apr. 29, 2003

(54) METHOD AND APPARATUS FOR IMAGE PROCESSING FOR PERFORMING A COLOR CONVERSION

(75) Inventors: Takahiro Yagishita, Yokohama (JP); Yukiko Yamazaki, Yokohama (JP); Nekka Matsuura, Ohta-ku (JP); Hiromi Okubo, Yokohama (JP); Hiroyuki Shibaki, Kawasaki (JP); Hiroshi Ishii, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/330,007

(22) Filed: Jun. 11, 1999

(30) Foreign Application Priority Data

Jun. 12, 1998 (JP) .......................... 10-181486

(51) Int. Cl.$^7$ ................................ G06K 9/00
(52) U.S. Cl. .................................... 382/162
(58) Field of Search ................. 382/162, 163, 382/240; 345/600, 603; 375/240.19; 348/398.1, 663, 34, 35

(56) References Cited

U.S. PATENT DOCUMENTS

| 4,979,129 | A |   | 12/1990 | Okubo et al. ............... 345/600 |
| 5,410,619 | A |   | 4/1995  | Fujisawa et al. ............ 382/254 |
| 5,754,702 | A | * | 5/1998  | Simpson .................... 382/240 |
| 5,835,687 | A | * | 11/1998 | Brown et al. ............... 395/109 |
| 5,880,856 | A | * | 3/1999  | Ferriere .................... 358/432 |
| 6,052,205 | A | * | 4/2000  | Matsuura ................ 358/426.12 |

FOREIGN PATENT DOCUMENTS

| JP | 63-216747 | 9/1988  |
| JP | 63-268659 | 11/1988 |
| JP | 2-101497  | 4/1990  |
| JP | 2-243056  | 9/1990  |
| JP | 2-274178  | 11/1990 |
| JP | 4-170866  | 6/1992  |
| JP | 6-292006  | 10/1994 |

OTHER PUBLICATIONS

Antonini et al. "Image coding using wavelet transform." IEEE Transactions on Image Processing. vol. 1, No. 2, Apr. 1992, p. 205–220.*

* cited by examiner

*Primary Examiner*—Amelia M. Au
*Assistant Examiner*—Colin LaRose
(74) *Attorney, Agent, or Firm*—Oblon, Spivak, McClelland, Maier & Neustadt, P.C.

(57) ABSTRACT

An image processing apparatus includes a converter, a calculator and a reverse converter. The converter performs a frequency conversion operation on a color image signal which includes a brightness signal and color signals and divides values of each of the brightness signal and the color signals into high frequency coefficients and a low frequency coefficient. The calculator calculates the high frequency coefficients of the brightness signal and the color signals, generates a set of different high frequency coefficients, and produces a new brightness signal by adding the low frequency coefficient of the brightness signal to the set of different high frequency coefficients. The reverse converter performs a reverse frequency conversion operation on the new brightness signal.

9 Claims, 4 Drawing Sheets

METHOD AND APPARATUS FOR IMAGE PROCESSING FOR PERFORMING A COLOR CONVERSION

CROSS-REFERENCE TO FOREIGN APPLICATION

This application claims priority rights of and is based on Japanese Patent Application No. JPAP10-181486 filed on Jun. 12, 1998 in the Japanese Patent Office, the entire contents of which are hereby incorporated by reference.

BACKGROUND OF THE INVENTION

1. Field of the Invention

The present invention relates generally to a method and apparatus for image processing, and more particularly to a method and apparatus for image processing which is capable of converting a color image signal to a mono-chrome signal.

2. Discussion of the Background

Conventionally, mono-chrome image output machines such as, for example, a facsimile machine, a digital copying machine, a printer, and a mono-chrome display machine, have been provided with an image processing technique which subtracts and outputs a brightness signal when handling a color image signal. However, the brightness signal is insufficient to represent colors. For example, two colors which have the same brightness but different colors can not be represented by a single brightness signal.

Several different types of solution for this problem have been proposed. A first type of solution has been proposed by Japanese Laid-Open Patent Application Nos. 63-268659 (1988), 63-216747 (1988), 02-101497 (1990), 02-274178 (1990), and 02-243056 (1990). This solution uses a technique which converts each color to a corresponding hatching pattern in a predefined manner. A second type of solution which converts a color difference to a mono-chrome grayscale is described in Japanese Laid-Open Patent Application No. 04-170866 (1992). A third type of solution by Japanese Laid-Open Patent Application No. 06-292006 (1994) uses a technique which produces a contour signal obtained by differentiating color signals and adds it to a brightness signal.

However, each of these solutions have its own problems. For example, the first and second types of solution are limited in the number of colors to express and the third type is too complex to handle. In addition, when a color signal is changed to a mono-chrome signal, it is generally required that a resolution of the color signal is changed.

SUMMARY OF THE INVENTION

Accordingly, an object of the present invention is to provide a novel image processing apparatus which can properly produce a mono-chrome image signal from a color image signal and freely change a resolution.

Another object of the present invention is to provide a novel method for image processing which can properly produce a mono-chrome image signal from a color image signal and freely change a resolution.

To achieve these and other objects, a novel image processing apparatus includes a converter which performs a frequency conversion operation on a color image signal which includes a brightness signal and color signals and divides values of each of the brightness signal and the color signals into high frequency coefficients and a low frequency coefficient, a calculator which calculates the high frequency coefficients of the brightness signal and the color signals, generates a set of different high frequency coefficients, and produces a new brightness signal by adding the low frequency coefficient of the brightness signal to the set of different high frequency coefficients, and a reverse converter which performs a reverse frequency conversion operation on the new brightness signal.

The frequency conversion operation and the reverse frequency conversion operation may be in conformance to a Wavelet conversion method and produce a mono-chrome signal of a $2^n$-multiple resolution based on a color image signal wherein n is an integer having a value of zero or a negative integer such as −1, −2, and so on.

Further, to achieve the above-mentioned objects, a novel method for image processing which includes the steps of performing a frequency conversion operation on a color image signal which includes a brightness signal and color signals, dividing values of each of the brightness signal and the color signals into high frequency coefficients and a low frequency coefficient, calculating the high frequency coefficients of the brightness signal and the color signals, generating a set of different high frequency coefficients, producing a new brightness signal by adding the low frequency coefficient of the brightness signal to the set of different high frequency coefficients, and performing a reverse frequency conversion operation on the new brightness signal.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
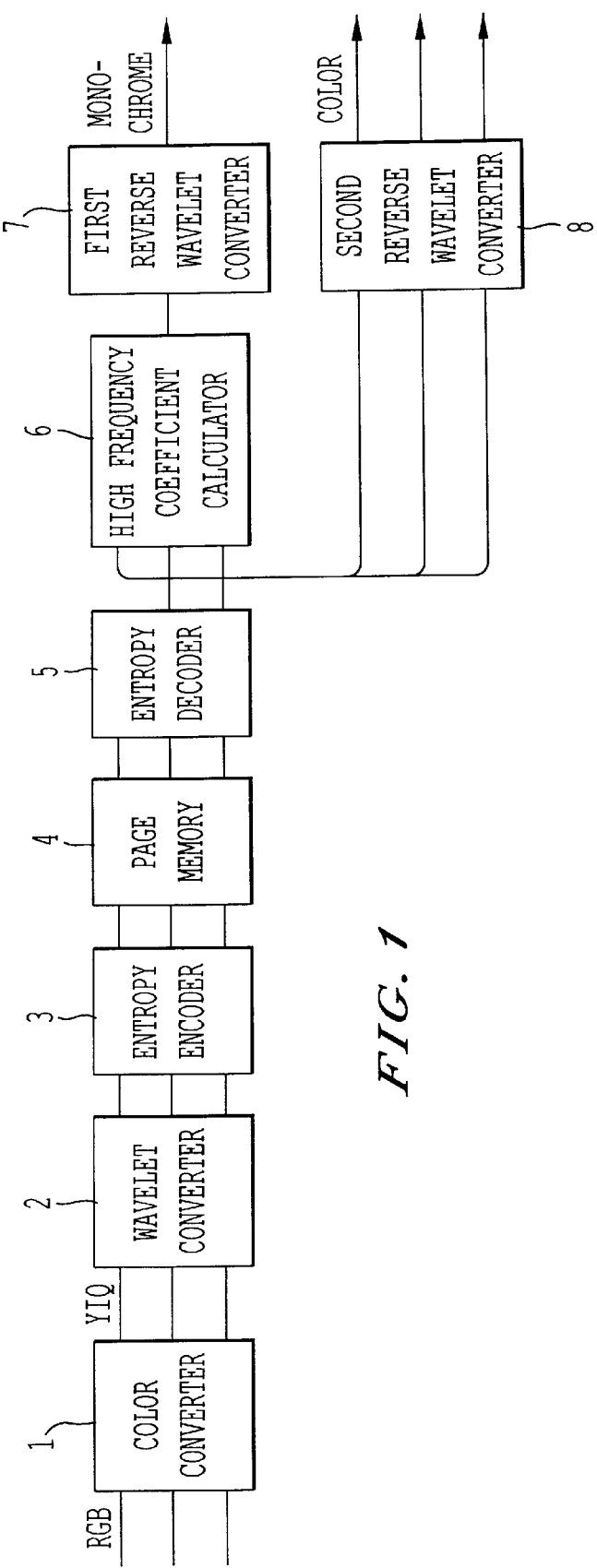
FIG. 1 is a block diagram of an image processing apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram of an image processing apparatus 100 according to an embodiment of the present invention. The image processing apparatus 100 of FIG. 1 includes a color converter 1, a wavelet converter 2, an entropy encoder 3, a page memory 4, an entropy decoder 5, a high-frequency-coefficient calculator 6, and first and second wavelet reverse converters 7 and 8.

The color converter 1 linearly converts input color image data of B (blue), G (green), and R (red) signals into signals Y, I, and Q which forms a color space for brightness and color difference. The following equations are used for such a conversion, for example:

$$Y=0.30R+0.59G+0.11B,$$

$$I=0.74(R-Y)-0.27(B-Y), \text{ and}$$

$$Q=0.48(R-Y)+0.41(B-Y).$$

By converting the color space into the above, a statistical electric power of an image can be concentrated on the brightness signal Y and, as a result, an entropy can be reduced.

Then, the Y, I, and Q signals are respectively converted with wavelet conversion by the wavelet converter 2. The following simple equations are used for this conversion, for example:

$$S(n)=|[x(2n)+x(2n+1)]/2|, \text{ and}$$

$$D(n)=x(2n)-x(2n+1).$$

Figure 2:
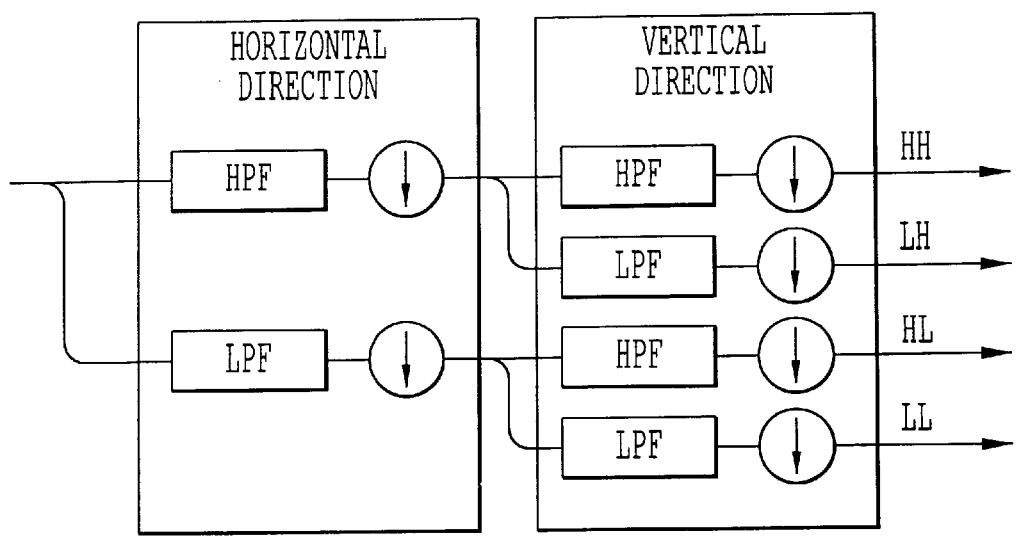
FIG. 2 illustrates a Wavelet frequency conversion operation performed by the image processing apparatus of FIG. 1.

FIG. 2 shows an exemplary block diagram of the Wavelet conversion (sub-band) by the Wavelet converter 2 using the above equations S(n) and D(n) as low-pass and high-pass filters, respectively. Such a Wavelet converter 2 processes the source image data first in the horizontal direction with the high-pass filter ("HPF") using D(n) and the low-pass filter ("LPF") using S(n), and the source image data is separated in two data streams. FIG. 2 shows an exemplary block diagram of the Wavelet conversion (sub-band) by the Wavelet converter 2 using the above equations S(n) and D(n) as low-pass and high-pass filters, respectively. Such a Wavelet converter 2 processes the source image data first in the horizontal direction with the high-pass filter ("HPF") using S(n) and the low-pass filter ("LPF") using D(n), and the source image data is separated in two data streams.

Figure 3:
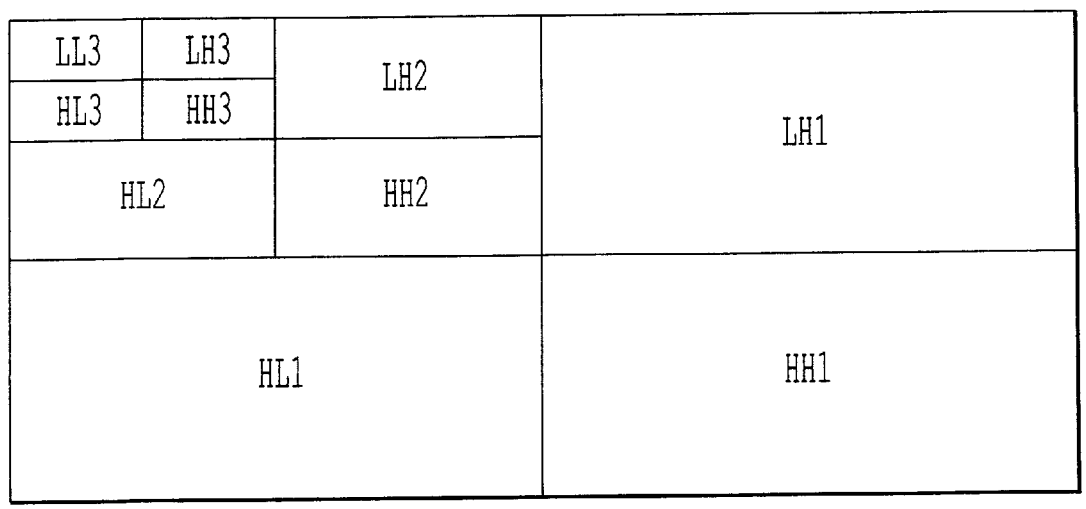
FIG. 3 illustrates a three-time conversion performed by the image processing apparatus of FIG. 1.

Subsequently, the Wavelet converter 2 processes each of the separated image data streams in the vertical direction again with the high-pass filter ("HPF") using D(n) and the low-pass filter ("LPF") using S(n). As a result, the source image data is separated in four sub-band signals; a horizontal high band signal ("HL"), a vertical high band signal ("LH"), a diagonal high band signal ("HH"), and a low band signal ("LL"). A coefficient of LL is a mean value of four pixels and can be considered as image data same as the source image data with a half-reduced resolution. The Wavelet converter 2 further processes the coefficient of LL recursively in the manner as mentioned above, in the horizontal and vertical directions with the high-pass filter ("HPF") using D(n) and the low-pass filter ("LPF") using S(n). FIG. 3 shows an exemplary result of three-time conversion on the LL element. By the three-time conversion, 64 pixels (8×8 pixels) are divided in 10 coefficients; LL3, HL3, LH3, HH3, HL2, LH2, HH2, HL1, LH1, and HH1. These coefficients are encoded to compressed data through an entropy encoding operation by the entropy encoder 3 and are stored in the page memory 4.

When the image data is sent to a color output machine, the image processing apparatus 100 performs the following processes. The compressed data is read from the page memory 4 and is decoded through an entropy decoding operation by the entropy decoder 5 so that the Wavelet-converted image signals Y, I, and G are regenerated. Then, the signals Y, I, and G are sent to the second Wavelet converter 8 which then performs a reverse Wavelet conversion operation for calculating the coefficients of the Y, I, and G signals so as to return the data back to the original coefficient values of the signals Y, I, and G. Thereby, the image processing apparatus 100 can output the signals Y, I, and G from the second reverse Wavelet converter 8. After that, the signals Y, I, and G may further be decoded back to B, G, and R signals so that the color output machine can use them as the color signals.

When the image data is sent to a mono-chrome output machine, the image processing apparatus 100 carries out the following processes. The compressed data is read from the page memory 4 and is decoded through an entropy decoding operation by the entropy decoder 5 so that the Wavelet-converted image signals Y, I, and G are regenerated. Then, the signals Y, I, and G are sent to the high-frequency-coefficient calculator 6 which then calculates the high frequency coefficients HL, LH, and HH of each of the Y, I, and Q signals. As a result of such calculation, the high-frequency-coefficient calculator 6 generates a calculated signal which accordingly has high frequency coefficients HL, LH, and HH. Then, the high-frequency-coefficient calculator 6 adds the low frequency coefficient LL of the Y signal to the calculated signal. Thereby, the high-frequency-coefficient calculator 6 outputs a single calculated signal which has the coefficients LL, HL, LH, and HH. Such a single calculated signal is then sent to the first reverse Wavelet converter 7 which then performs a reverse Wavelet conversion operation so as to convert the coefficients in reverse. The resultant signal is used as a mono-chrome image signal. In this way, the image processing apparatus 100 can generate a mono-chrome signal based on the color signals.

Figure 4:
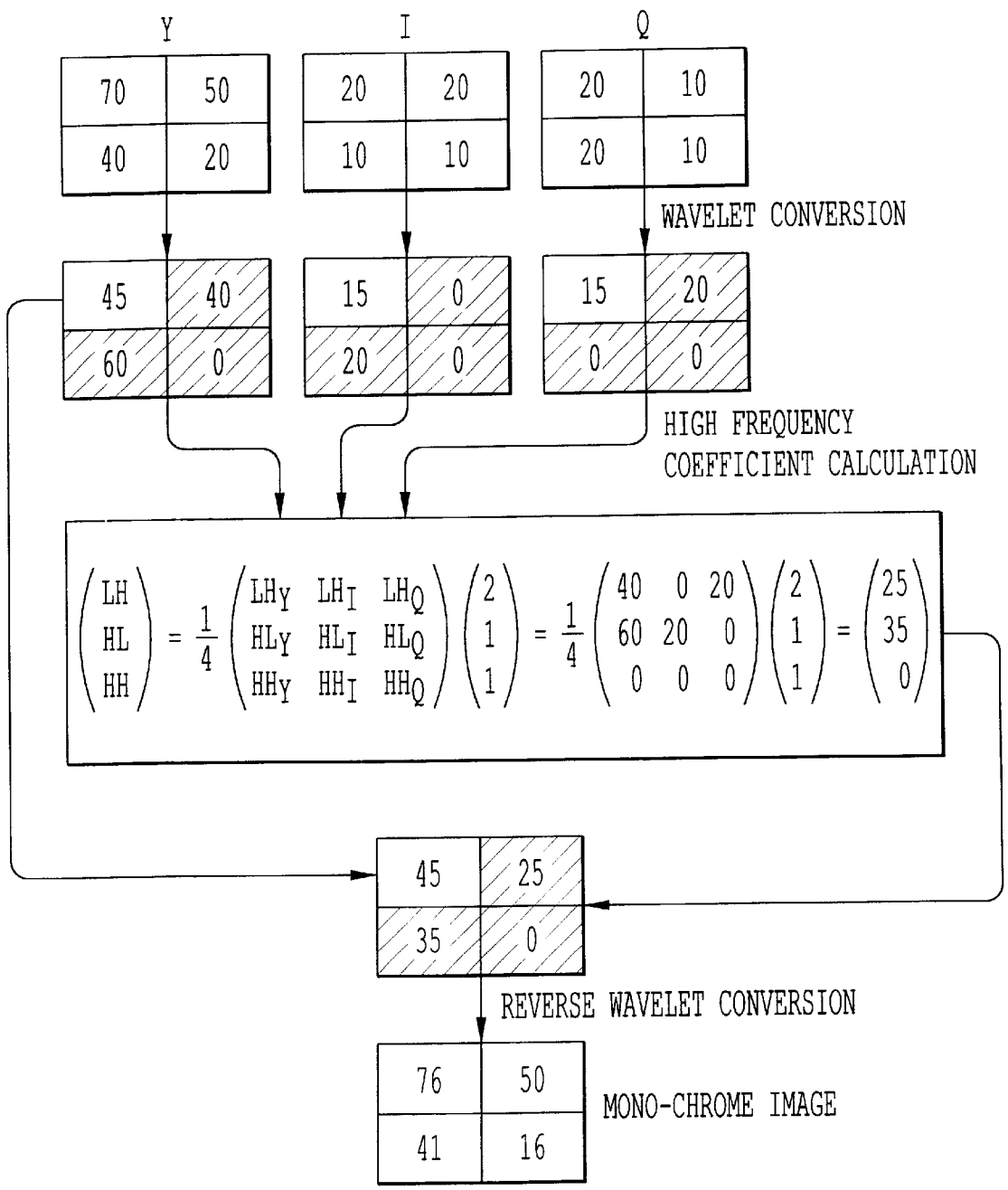
FIGS. 4 and 5 illustrate a principle operation of generating a mono-chrome signal having a reflection of a color signal.
Figure 5:
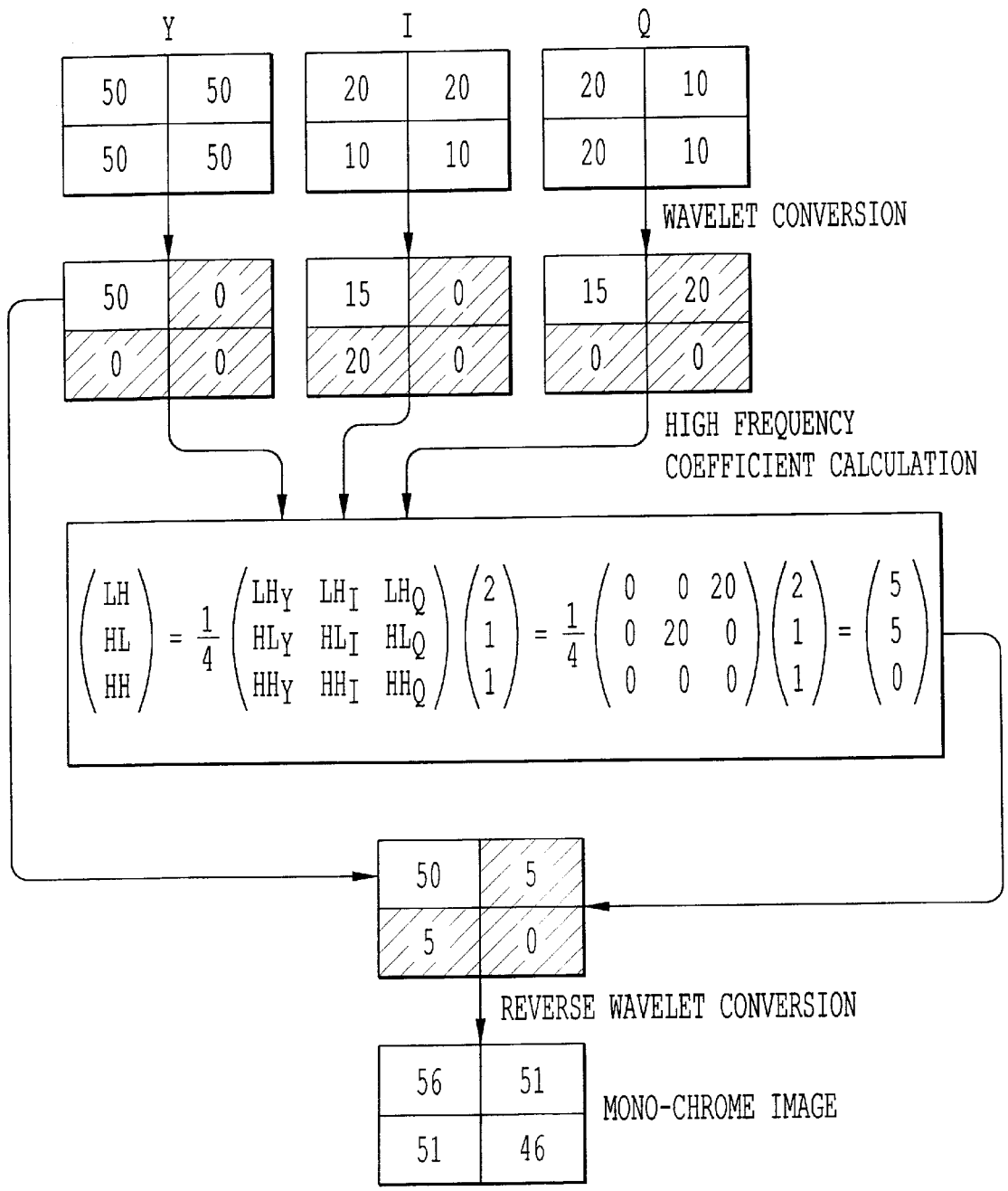

FIG. 4 shows an example of the above operation. In the high-frequency-coefficient calculator 6, the signals Y, I, and G are calculated with a weight ratio of 2:1:1. The resultant mono-chrome image signal has the coefficients which are similar to those of the high-weighted signal Y. However, these coefficients reflect the changes of the color signals. A clearer example is shown in FIG. 5, which is a signal representing an image region where the brightness is even and the color varies. The resultant mono-chrome image signal has the coefficients reflecting the changes of the color signals against the original brightness signal which is flat.

Conversion of an image resolution by the image processing apparatus 100 is accomplished as follows. As described earlier, the low frequency coefficient LL can be considered as image data the same as the source image data with a half-reduced resolution. More specifically, the first low frequency coefficient layer generated by the three-time conversion represents image data of a half-reduced resolution. In the same manner, the second and third low frequency coefficient layers represent one-third-reduced and one-fourth-reduced resolutions, respectively. That is, a ⅛ resolution of an original image can be achieved by performing the reverse Wavelet conversion operation using LL3. Also, a ¼ resolution can be obtained by using LL3, HL3, LH3, and HH3 and a ½ resolution can be obtained by using LL3, HL3, LH3, HH3, HL2, LH2, and HH2.

When the resolution of an image is changed in this way, the high-frequency-coefficient calculator 6 performs the calculations, as described above, on each low frequency coefficient layer to produce a mono-chrome signal. Such a calculation may alternatively be a linear operation, or a conditional operation.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An image processing apparatus, comprising:
    a converter for performing a frequency conversion operation on a color image signal, said color image signal including a first brightness signal and at least one color signal, and for dividing values of said first brightness signal into a first plurality of high frequency coefficients and at least one low frequency coefficient, and for dividing values of said at least one color signal into a second plurality of high frequency coefficients and at least one low frequency coefficient;
    a calculator
        for calculating said first plurality of high frequency coefficients and said second plurality of high frequency coefficients,
        for generating a third plurality of high frequency coefficients using said first plurality of high frequency coefficients and said second plurality of high frequency coefficients, and
        for generating a second brightness signal by combining said at least one low frequency coefficient of said first brightness signal with said third plurality of high frequency coefficients; and
    a reverse converter for performing a reverse frequency conversion operation on said second brightness signal.

2. The image processing apparatus according to claim 1, wherein said frequency conversion operation and said reverse frequency conversion operation conform to a Wavelet conversion method and produce a mono-chrome signal of a $2^n$-multiple resolution based on a color image signal, wherein n has a value of one of 0 and a negative integer.

3. The image processing apparatus of claim 1, wherein said calculator generates said third plurality of high frequency coefficients by linearly combining said first plurality of high frequency coefficients and said second plurality of high frequency coefficients.

4. An image processing apparatus, comprising:
    converting means for performing a frequency conversion operation on a color image signal, said color image signal including a first brightness signal and at least one color signal, and for dividing values of said first brightness signal into a first plurality of high frequency coefficients and at least one low frequency coefficient, and for dividing values of said at least one color signal into a second plurality of high frequency coefficients and at least one low frequency coefficient;
    calculating means
        for calculating said first plurality of high frequency coefficients and said second plurality of high frequency coefficients,
        for generating a third plurality of high frequency coefficients using said first plurality of high frequency coefficients and said second plurality of high frequency coefficients, and
        for generating a second brightness signal by combining said at least one low frequency coefficient of said first brightness signal with said third plurality of high frequency coefficients; and
    reverse converting means for performing a reverse frequency conversion operation on said second brightness signal.

5. The image processing apparatus according to claim 4, wherein said frequency conversion operation and said reverse frequency conversion operation conform to a Wavelet conversion method and produce a mono-chrome signal of a $2^n$-multiple resolution based on a color image signal, wherein n has a value of one of 0 and a negative integer.

6. The image processing apparatus of claim 4, wherein said calculating means generates said third plurality of high frequency coefficients by linearly combining said first plurality of high frequency coefficients and said second plurality of high frequency coefficients.

7. A method for image processing, comprising:
    performing a frequency conversion operation on a color image signal, said color image signal including a first brightness signal and at least one color signal;
    dividing values of said first brightness signal into a first plurality of high frequency coefficients and at least one low frequency coefficient;
    dividing values of said at least one color signal into a second plurality of high frequency coefficients and at least one low frequency coefficient;
    calculating said first plurality of high frequency coefficients and said second plurality of high frequency coefficients;
    generating a third plurality of high frequency coefficients using said first plurality of high frequency coefficients and said second plurality of high frequency coefficients;
    generating a second brightness signal by combining said at least one low frequency coefficient of said first brightness signal with said third plurality of high frequency coefficients; and
    performing a reverse frequency conversion operation on said second brightness signal.

8. The method according to claim 7, wherein said frequency conversion operation and said reverse frequency conversion operation conform to a Wavelet conversion method and produce a mono-chrome signal of a $2^n$-multiple resolution based on a color image signal, wherein n has a value of one of 0 and a negative integer.

9. The method for image processing of claim 7, wherein the step of generating the third plurality of high frequency coefficients comprises generating said third plurality of high frequency coefficients by linearly combining said first plurality of high frequency coefficients and said second plurality of high frequency coefficients.

* * * * *